United States Patent [19]

Matsumura et al.

[11] Patent Number: 4,853,092
[45] Date of Patent: Aug. 1, 1989

[54] PRODUCTION OF MULTICOLOR DISPLAY

[75] Inventors: Akira Matsumura, Hirakata; Yasuo Nozaki, Kobe; Katsukiyo Ishikawa, Kyoto, all of Japan

[73] Assignee: Nippon Paint Co., Ltd., Osaka, Japan

[21] Appl. No.: 186,074

[22] Filed: Apr. 25, 1988

[30] Foreign Application Priority Data

Apr. 24, 1987 [JP] Japan .................. 62-102339

[51] Int. Cl.$^4$ .................................. C25D 13/02
[52] U.S. Cl. ........................ 204/18.1; 204/181.7
[58] Field of Search ..................... 204/181.7, 18.1

[56] References Cited

U.S. PATENT DOCUMENTS

| 3,565,612 | 2/1971 | Clark | 204/18.1 |
| 4,400,252 | 8/1983 | Ushijima | 204/18.1 |
| 4,522,691 | 6/1985 | Suginoya | 204/18.1 |
| 4,608,129 | 8/1986 | Tamamura | 204/18.1 |

Primary Examiner—John F. Niebling
Assistant Examiner—Isabelle Rodriguez
Attorney, Agent, or Firm—Wenderoth, Lind & Ponack

[57] ABSTRACT

The first embodiment of the present invention is a process for producing a multicolor display comprising the following steps (a) a transfer panel which has thereon electroconductive layers insulated with each other is immersed in an electrodeposition bath, in which a voltage is applied to one or more of said electroconductive layers to be colored with a same color to form the color layer thereon, (b) said step (a) is repeated with the other colors to form a multicolor layer, and (c) said multicolor layer is transferred onto a transparent substrate. The second embodiment of the present invention is an improved process of the first embodiment, wherein both the multicolor layer and the electroconductive layer are transferred onto the transparent substrate.

4 Claims, 3 Drawing Sheets

PRODUCTION OF MULTICOLOR DISPLAY

FIELD OF THE INVENTION

The present invention relates to a multicolor display. More particularly, it relates to a multicolor display having a multicolor layer formed by electrodeposition.

BACKGROUND OF THE INVENTION

A multicolor display is employed as a display for a liquid crystal color television and the like. It generally is composed of a transparent substrate and a color layer thereon. Recently, in a process for producing a multicolor display, electrodeposition has become noteworthy.

Japanese Kokai Publication (unexamined) No. 114572/1984 discloses a process for producing a multicolor display wherein, as shown in FIG. 3, a transparent electrode 2 is patterned on a glass substrate 4 (see FIG. 3(a)) which is then immersed in an electrodeposition bath while a voltage is applied to a portion of the transparent electrode 2 to be colored with, for example, red to form a red color layer 3 (see FIG. 3(b)), then green and blue color layers 3 were formed on each portion of the electrode 2 by passing electricity (see FIG. 3(c) and (d)). In the apparatus produced by the process mentioned above, the transparent electrode is employed not only for electrodepositing a color layer, but also for driving liquid crystal. However, since the color layer electrodeposited on the electrode is insulating, a high driving voltage for liquid crystal is needed. In order to reduce the driving voltage, an additional transparent layer which is for driving liquid crystal is formed on the color layer (see FIG. 3(e)). The formation of the additional electrode is time and cost consuming because it makes the process complicated and requires a further patterning process. Also, since transparent electrode generally has a light transmittance of 80 to 85%, two transparent electrodes reduces the light transmittance of the display, thus deteriorating the properties of the multicolor display.

Another process which does not employ electrodeposition has also been proposed, which includes screen printing, photolithography and the like. Screen printing has a limit in the miniaturization of the pattern and in the accuracy of printing which results in a decline in the discrepancy of the pattern. Photolithography makes possible miniaturization of the pattern, but protection against dyeing is necessary in order to avoid double dyeing. It makes the process complicated.

SUMMARY OF THE INVENTION

The present invention provides a process for producing a multicolor display comprising the following steps:
 (a) a transfer panel which has thereon electroconductive layers insulated with each other is immersed in an electrodeposition bath, in which a voltage is applied to one or more of said electroconductive layers to be colored with a same color to form the color layer thereon,
 (b) said step (a) is repeated with the other colors to form a multicolor layer, and
 (c) said multicolor layer is transferred onto a transparent substrate.

Also the present invention provides a process for producing a multicolor display comprising the following steps:
 (a) electroconductive layers insulated from each other are formed on a transfer panel,
 (b) a voltage is applied to one or more of said electroconductive layers to be colored with the same color to form the color layer,
 (c) said step (b) is repeated to form a multicolor layer, and
 (d) said multicolor layer and said electroconductive layer are transferred onto a transparent substrate.

DETAILED DESCRIPTION OF THE INVENTION

An electroconductive layer 2 is formed on a transfer panel 1 which is made from glass or plastics, as shown in FIG. 1(a). The electroconductive layer 2 is formed from an electroconductive metal, such as copper, silver and the like, or a transparent electroconductive material, such as tin oxide, indium and the like. The electroconductive layer 2 is formed by spray coating, spattering and the like and patterned by chemical etching, dry etching and the like. The patterned electroconductive layer 2 is generally separated to two or more portions, each of which is electrically insulated with others and colored with the same color.

Figure 1:
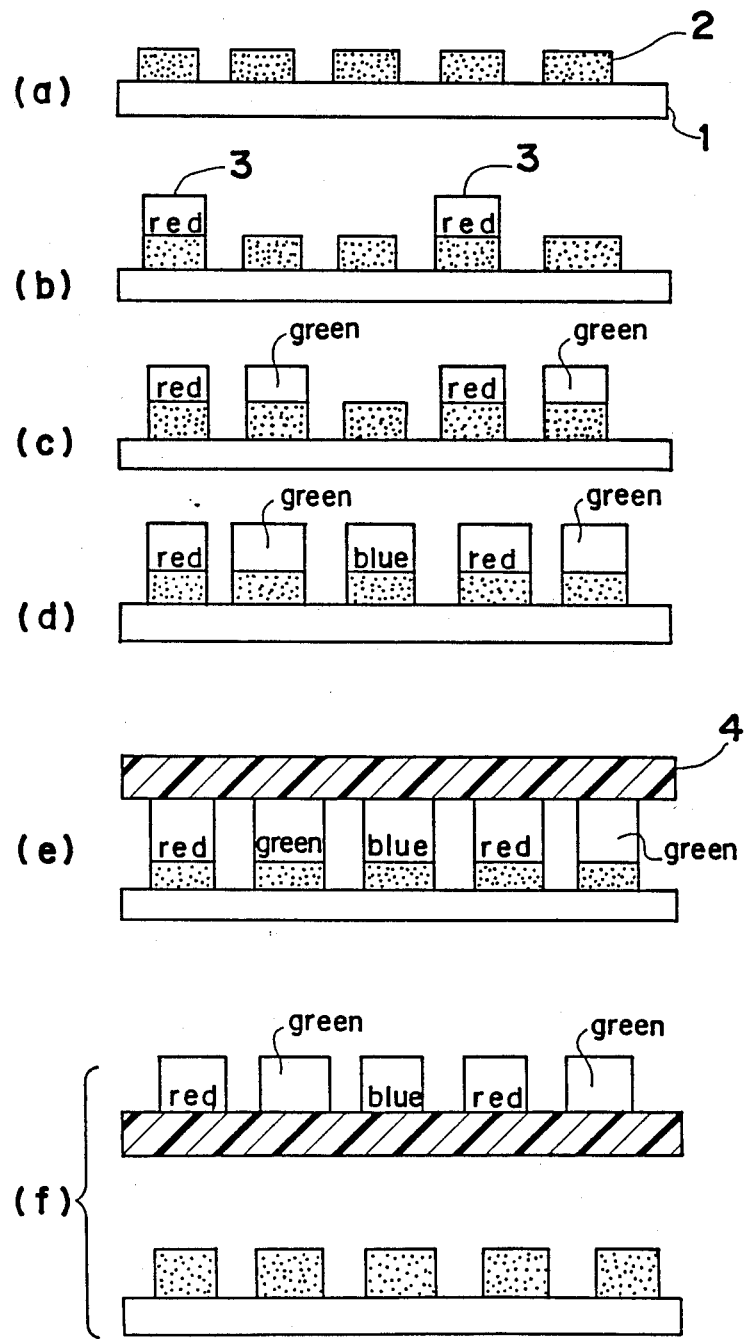
FIG. 1 is a process drawing showing the first embodiment of the process of the present invention.

On the transfer panel 1 having the patterned electroconductive layer 2, as shown in FIG. 1(b) to (d), a multicolor layer is formed by electrodeposition. For example, assuming that three colors, i.e. red, green and blue are formed, the transfer panel is immersed in a red electrodeposition bath and electrodeposited only in a patterned portion to be colored with red to from a red electrodeposited coating thereon, which is shown in FIG. 1 (b). The panel 1 is rinsed and dried, and then electrodeposited with green in a similar manner mentioned above to form a red and green electrodeposited coating, as shown in FIG. 1(c). This is the same in FIG. 1(d).

The synthetic polymer resin employed as a filmforming component in the electrodeposition baths mentioned above can be cationic or anionic, including those known to the skilled in the art, for example acrylic resins, epoxy resins, urethane resins, polybutadiene resins, polyamide resins, carboxyl group-containing polybutadienes, carboxyl group-containing alkyd resins and the like. Detailed informations of the electrodeposition bath and the others are described in Japanese Patent Application Ser. No. 46321/1987 to the present inventors and Japanese Kokai Publication No. 114592/1984. The electrodepositable coating composition can be either heat curable or photocurable.

Next, as is shown in FIG. 1(e), a transparent substrate 4 is contacted with the multicolor layer 3 formed on the transfer panel 1 and the multicolor layer 3, as shown in FIG. 1(f), is transferred onto the transparent substrate 4. Consequently, the transfer panel 1 having the patterned electroconductive layer 2 remains, which can be again used for a transfer panel of FIG. 1(a). This is the first embodiment, according to which the transfer panel 1, if patterned, can be repeatedly used to enhance productive eficiency.

The transference may be carried out using a rubber coated roller, while the transparent substrate 4 is contacted with the multicolor layer 2. If the electrodepositable coating composition is photocurable, the transfer panel 1 is taken off after it is exposed to ultraviolet light. Generally, cure can be done with 200 mJ/cm$^2$ at room temperature in air. If it is required to obtain a high fastness of the multicolor layer, intensity of radiation may increase. Also, if the coating composition is heat curable, cure may be conducted by heating before or after the transfer panel 1 is taken off.

A transparent electrode is then formed on the multicolor layer on the transparent substrate 4 by vapor deposition, spattering and the like to form a multicolor display of the present invention.

The second embodiment of the present invention is very similar to the first embodiment mentioned above. The steps shown in FIG. 2(b) to (e) are corresponding to the steps shown in FIG. 1(a) to (d) and therefore an explanation of these steps are omitted. It, however, is required that the electroconductive layer 2 be transparent, i.e. tin oxide, indium and the like, because the electrode 2 is transferred onto the transparent substrate 4 together with the multicolor layer 3.

In the step of FIG. 2(a), a release layer 5 may be formed on the transfer panel 1 in order to promote a transferring of both the electroconductive layer 2 and the multicolor layer 3. If transference is smoothly conducted without the release layer 5, it is not necessary. An example of the release layer 5 is a silicone thin film and the like.

After the steps of FIG. 2(b) to (e), the multicolor layer 3 and the transparent electroconductive layer 2 are transferred onto the transparent substrate, as shown in FIG. 2(f). The transference can be conducted as mentioned in the first embodiment (FIG. 1).

Figure 2:
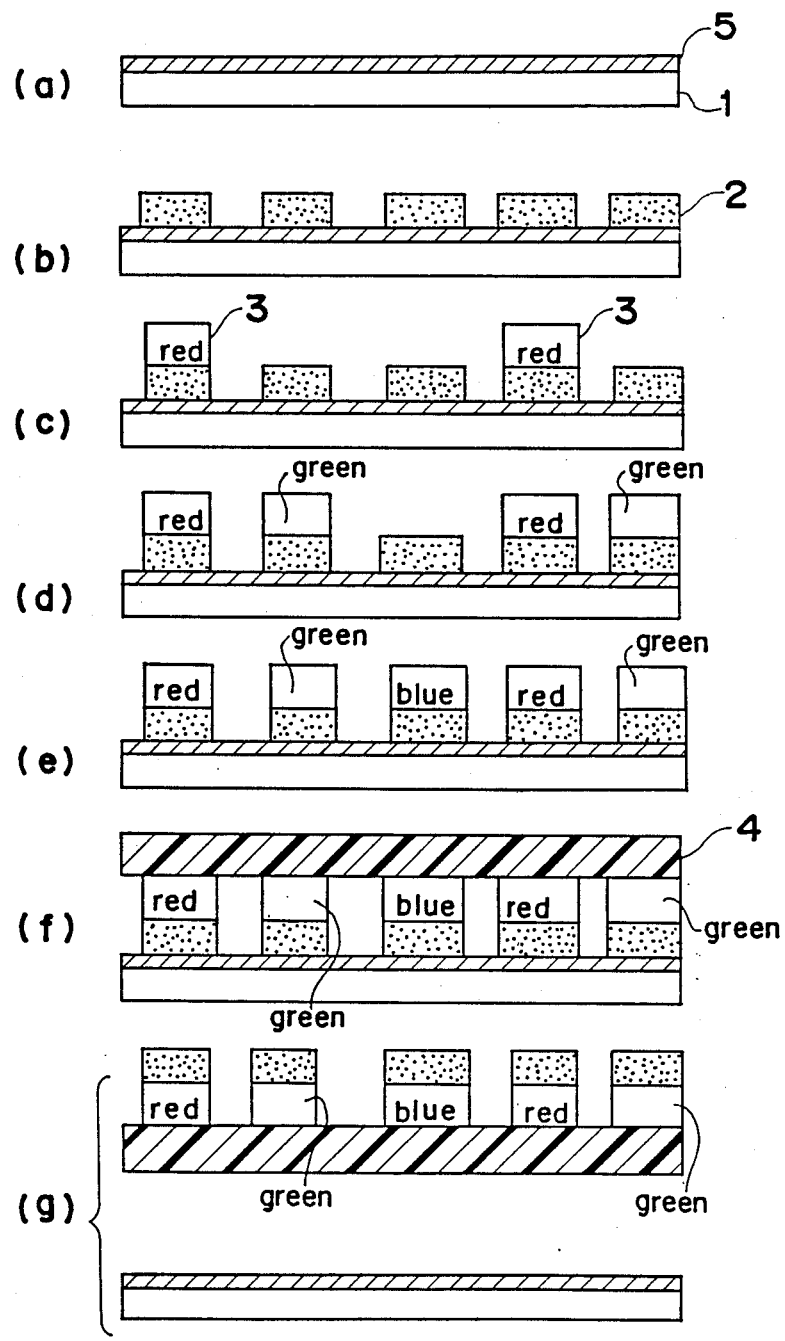
FIG. 2 is a process drawing showing the second embodiment of the process of the present invention.
Figure 3:
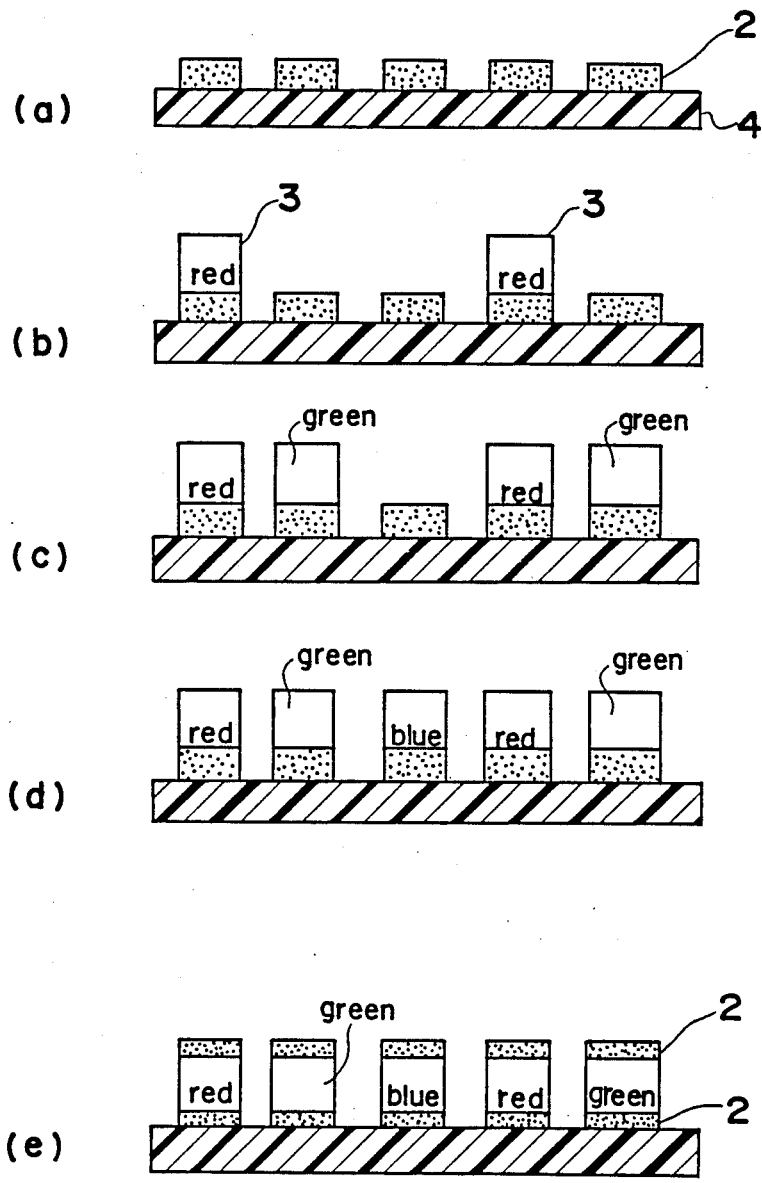
FIG. 3 is a process drawing indicating the process of Japanese Kokai Publication (unexamined) No. 114572/1984.

After taking off the transfer panel 1, as shown in FIG. 2(g), there remains a multicolor display not having an electrode between the multicolor layer 3 and the transparent substrate 4 and the transfer panel. Accordingly, the multicolor display of the second embodiment of the present invention only has one electrode. The remaining transfer panel of the step of FIG. 2(g) can used in the step FIG. 2 (a).

EXAMPLES

The present invention is further illustrated by the following examples which are not to be construed as limiting the present invention to their details.

EXAMPLE 1

An organic polymer binder having a weight average molecular weight of about 70,000 was obtained by reacting N,N-diethylaminoethyl methacrylate, styrene, ethylacrylate and a 1/1 molar ratio reaction product of p-hydroxybenzoic acid and glycidyl acrylate in a molar ratio of 3:2:4:1. A cationic photocurable resin composition was prepared by mixing 80 parts by weight of the organic polymer binder obtained above, 0.5 parts by weight of 2,2-dimethoxy-2-phenyl acetophenone and 14.5 parts by weight of trimethylolpropane triacrylate, which was diluted with ethylene glycol monobutyl ether to a volatile content of 80%. The obtained solution was neutralized with 0.5 equivalent of acetic acid and adjusted with deionized water to a volatile content of 10% to form an electrodepositable resin composition.

The obtained resin composition was mixed with a pigment in a following formulation to obtain three color cationic electrodeposition baths.

|  | Blue | Green | Red |
| --- | --- | --- | --- |
| Cationic photocurable electrodeposition coating composition | 995.0 | 995.0 | 995.0 |
| Phthalocyanine Blue | 5.0 | — | — |
| Phthalocyanine Green | — | 5.0 | — |
| Azo metal salt red pigment | — | — | 5.0 |
|  | 1000.0 | 1000.0 | 1000.0 |

(1) Patterning step

An indium oxide transparent electroconductive layer was formed on a polyester transfer panel and patterned by etching to a stripe form to form a transparent electrode.

(2) Electrodepositing step

In the transparent electrode, a portion to be colored with red was selected and connected to a cathode of a power source. The transfer panel was immersed in the red electrodeposition bath mentioned above and a potential difference of 50 V was applied for 2 minutes. The electrodeposited panel was taken out of the electrodeposition bath and rinsed with water, while the electrodeposited resin turns to be water-insoluble so as not to wash out. After rinsing, the panel was dried to form a transparent red polymer film thereon. This process was repeated with blue and green.

(3) Transferring step

A transparent glass substrate was contacted with the multicolor layer of the transfer panel and the multicolor layer was transferred onto the glass substrate by using a rubber coating roller. The polyester transfer panel was the removed therefrom.

(4) Curing step

The multicolor layer was cured by exposing to a high pressure mercury lamp to obtain a film thickness of 2.0 micrometer.

EXAMPLE 2

Preparation of a Cationic Acrylic Resin

A reaction vessel equipped with a stirrer, a condenser, a dropping funnel and a thermometer was charged with 40 parts by weight of isopropyl alcohol, 2 parts by weight of azobisisobutylonitrile and heated to reflux. On starting reflux, a mixture of 30 parts by weight of glycidyl methacrylate, 5 parts by weight of hydroxyethyl metehacrylate, 30 parts by weight of styrene, 35 parts by weight of 2-ethylhexyl acrylate and 2 parts by weight of azobisisobutylonitrile was added over two hours and allowed to react for three hours under refluxing to obtain a colorless and transparent copolymer soltuion. Next, 5.3 parts by weight of di-n-propylamine and 84 parts by weight of isopropyl alcohol were added and further reacted for three hours at a refluxing temperature. The obtained resin solution had a nonvolatile content of 65% and a viscosity of 48 poise at 25° C. Then, 154 parts by weight of the resin solution was mixed with 27 parts by weight of a 10% acetic acid solution to obtain a cationic acrylic resin varnish.

Preparation of Cationic Electrodeposition Bath

Three cationic electrodeposition bath was prepared as follow:

|  | Blue | Green | Red |
|---|---|---|---|
| Cationic acrylic resin varnish obtained above | 55.0 | 55.0 | 55.0 |
| Ethylene glycol monoethyl ether | 18.0 | 18.0 | 18.0 |
| Isopropyl alcohol | 3.0 | 3.0 | 3.0 |
| Deionized water | 917.8 | 917.8 | 917.8 |
| Phthalocyanine Blue | 5.0 | — | — |
| Phthalocyanine Green | — | 5.0 | — |
| Azo metal salt red pigment | — | — | 5.0 |
|  | 1000.0 | 1000.0 | 1000.0 |

(1) Patterning step

Patterning process was conducted as generally described in Example 1.

(2) Electrodepositing step

Electrodeposition was carried out as generally described in Example 1 with the exception that a voltage of 40 V was applied for 3 minutes.

(3) Transferring step

Transferring process was conducted as generally described in Example 1.

(4) Curing step

The multicolor layer was cured by heating at 175° C. for 30 minutes to obtain a film thickness of 1.7 micrometer.

EXAMPLE 3

Preparation of an Anionic Acryl-Melamine Resin

A reaction vessel equipped with a stirrer, a condenser, a dropping funnel and a thermometer was charged with 40 parts by weight of ethylene glycol monoethyl ether and 2 parts by weight of azobisisobutylonitrile and heated to reflux. On starting reflux, a mixture of 25 parts by weight of acrylic acid and 2 parts by weight of azobisisobutylonitrle was added over two hours and then allowed to reflux for two hours to obtain a resin solution having a nonvolatile content of 72% and a viscosity of 18 poise at 25° C. Next, 60 parts by weight of the obtained resin solution was mixed with 20 parts by weight of butylized melamine resin and 2 parts by weight of triethylamine to form an anionic acryl-melamine resin varnish.

Preparation of Anionic Electrodeposition Bath

Three cationic electrodeposition bath was prepared as follows:

|  | Blue | Green | Red |
|---|---|---|---|
| Anionic acryl-melamine varnish obtained above | 94.3 | 94.3 | 94.3 |
| Isopropyl alcohol | 3.7 | 3.7 | 3.7 |
| Deionized water | 897.0 | 897.0 | 897.0 |
| Phthalocyanine Blue | 5.0 | — | — |
| Phthalocyanine Green | — | 5.0 | — |
| Azo metal salt red pigment | — | — | 5.0 |
|  | 1000.0 | 1000.0 | 1000.0 |

An anionic electrodeposition process was carried out as generally described in Example 1. The obtained multicolor layer having a thickness of 1.7 micrometer.

EXAMPLE 4

The same process was carried out as generally described in Example 1 with the exception that a transfer panel having a release layer of silicone was employed. Transferring of both the multicolor layer and the electroconductive layer was smoothly carried out and the obtained multicolor layer has a thickness of 1.0 micrometer.

EXAMPLE 5

Three cationic electrodeposition bath was prepared as follow:

|  | Blue | Green | Red |
|---|---|---|---|
| Cationic acrylic resin varnish obtained in Example 2 | 55.0 | 55.0 | 55.0 |
| Ethylene glycol monoethyl ether | 18.0 | 18.0 | 18.0 |
| Isopropyl alcohol | 3.0 | 3.0 | 3.0 |
| Deionized water | 917.8 | 917.8 | 917.8 |
| Phthalocyanine Blue | 5.0 | — | — |
| Phthalocyanine Green | — | 5.0 | — |
| Azo metal salt red pigment | — | — | 5.0 |
|  | 1000.0 | 1000.0 | 1000.0 |

(1) Patterning step

Patterning process was conducted as generally described in Example 4.

(2) Electrodepositing step

Electrodeposition was carried out as generally described in Example 4 with the exception that a voltage of 40 V was applied for 3 minutes.

(3) Transferring step

Transferring process was conducted as generally dscribed in Example 4.

(4) Curing step

The multicolor layer was cured by heating at 175° C. for 30 minutes to obtain a film thickness of 1.7 micrometer.

EXAMPLE 6

An anionic electrodeposition process was carried out as generally described in Example 5 with the exception that an acryl-melamine resin obtained in Example 3 was employed as an anionic electrodeposition resin instead of the cationic acrylic resin of Example 5 to form an aqueous solution having a resin solid content of 8% by weight. The result was the same as Example 2.

What is claimed is:

1. A process for producing a multicolor display composed of a transparent substrate and multicolor layers thereon, consisting essentially of the following steps:
   (a) immersing a transfer panel which has thereon electroconductive layers, insulated from each other, in an electrodeposition bath in which a voltage is applied to one or more of said electroconductive layers to be colored with a same color to form the color layer thereon,
   (b) repeating said step (a) with the other colors to form a multicolor layer, and
   (c) transferring said multicolor layer onto a transparent substrate.

2. A process for producing a multicolor display composed of a transparent substrate and multicolor layers on said transparent substrate and electroconductive layers on said multicolor layers, consisting essentially of the following steps:
   (a) forming electroconductive layers insulated, from each other, on a transfer panel, (b) applying a voltage to one or more of said electroconductive layers to be colored with a same color to form the color layer, (c) repeating said step (b) to form a multicolor layer, and (d) transferring said multicolor layer and said electroconductive layer onto a transparent substrate.

3. The process according to claim 2 wherein a release layer is formed between the transfer panel and the electroconductive layers.

4. The process according to claim 2 wherein said electroconductive layers are transparent.

* * * * *